Patented Jan. 29, 1924.

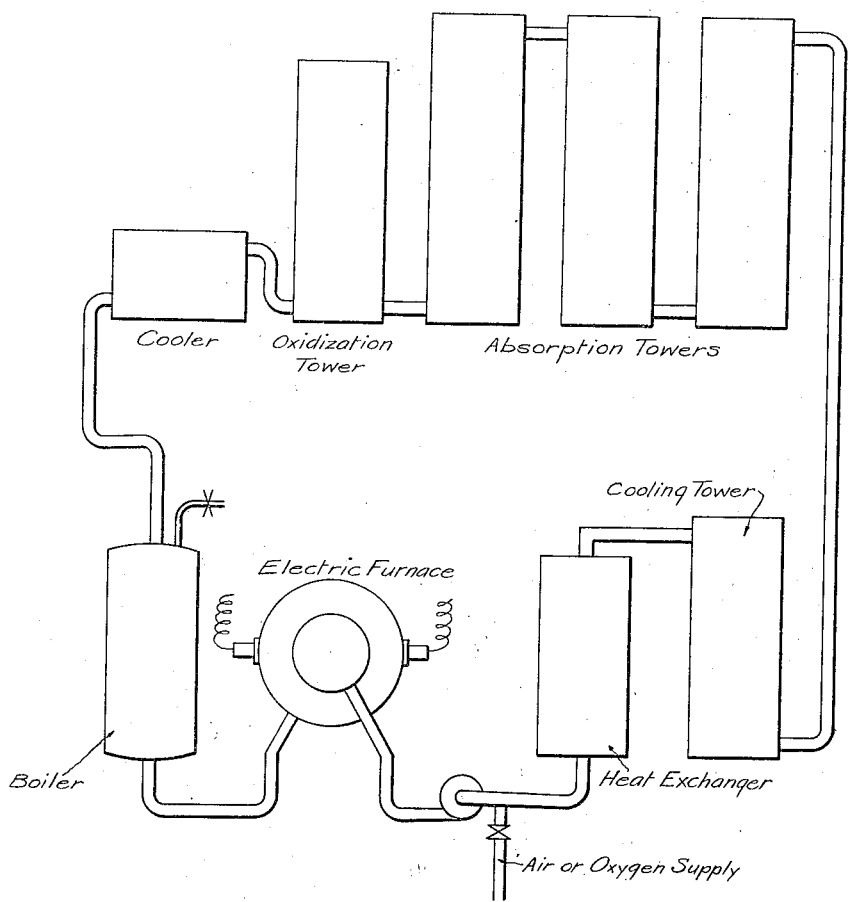

1,481,907

UNITED STATES PATENT OFFICE.

OLAF JENSEN, OF NOTODDEN, NORWAY, ASSIGNOR TO NORSK HYDRO-ELEKTRISK KVAELSLOFAKTIESELSKAB, OF CHRISTIANIA, NORWAY.

PROCESS FOR THE OXIDATION OF NITROGEN IN ELECTRIC FURNACES.

Application filed January 10, 1922. Serial No. 528,233.

*To all whom it may concern:*

Be it known that I, OLAF JENSEN, chemical engineer, a citizen of the Kingdom of Norway, residing at Notodden, Norway, have invented certain new and useful Improvements in Processes for the Oxidation of Nitrogen in Electric Furnaces, of which the following is a specification.

It has been known for some time that the yield of combined nitrogen per kw. in the electric arc furnaces can be increased by adding oxygen to the air employed. If operation with such addition of oxygen is to prove renumerative the gases must be returned from the absorption system to the electric furnaces.

Experience has proved that this cannot be done directly if the nitrous gases are absorbed in aqueous solutions or in water.

Gases coming from such an absorption system are saturated with moisture and this diminishes the output. Careful experiments have proved that the output depends on the moisture of the gases, in that the output diminishes as the moisture of the gases increases. Where circulation is employed the pipes and machinery will also be exposed to the destructive effect of the moist gases, which always contain a certain quantity of nitrogenous oxide.

This can, of course, be avoided by drying the gases with sulphuric acid. Since, however, large quantities of gas have to be dried, about 20000 cubic meters per hour for 10000 kw., a large amount of concentrated sulphuric acid is required, and this will have to be reconcentrated.

The present invention provides a process by which it is possible to dry the circulating gases to such an extent that the yield is not diminished, while, at the same time, corrosion of the pipes and compressors by the moisture is prevented.

The process consists in conducting the gases from the absorption towers into a refrigerating apparatus, for instance, a tower over which cold liquid is continually flowing. The gas is cooled in this tower to, for instance, 10° while at the same time the moisture diminishes until the vapour pressure of the gas and of the liquid is equal. If cold water is used the gas will be saturated with moisture at 10°. If, on the other hand, a cool solution of nitrate of lime is used, the gas will contain less moisture. As the gas which comes out of the refrigeration plant contains nitrous gases, it will, saturated with moisture, have a strongly corrosive effect on the iron pipes and the compressors which impel the gas into the electric furnaces. This is prevented in accordance with the present invention by heating the gas to, for instance, 50–70°. The relative humidity of the gas will then be so small that there will not be any condensation on the pipes or the machinery.

One manner of carrying out the invention practically is illustrated diagrammatically in the accompanying drawing.

After the gases, from the electric furnace have passed an ordinary system consisting of steam boiler, refrigeration plant, oxidation tank and absorption towers, they are conducted into a refrigeration tower over which cold water at 10° continually flows. The cool gases then pass through a heat exchanger after first having passed through a suitable mist filter not shown in the drawing. The gases are heated in the heat exchanger to 600°. They are conducted from the heat exchanger back to the electric furnace by means of a suitable pump. In this way a safe apparatus is obtained. The supplementary gas which is added to keep the composition of the gas constant is added to the gas before it reaches the pump.

I claim:

1. Process for the oxidation of nitrogen in electric furnaces and obtaining nitrogen products which comprises circulating the gas through a system including an absorption tower, bringing the gases from the absorption tower into direct contact with a cooling liquid and then heating said gases to so high a temperature that no condensation will take place in the pipes or machinery.

2. In the cyclic process of oxidizing nitrogen in electric furnaces, the steps which consist in absorbing the gaseous reaction products in an aqueous medium, cooling the absorbed gases, and thereafter elevating the temperature of the gases to such degree that condensation is avoided.

3. In the cyclic process of oxidizing nitrogen in electric furnaces, the steps which consist in absorbing the gaseous reaction products in an aqueous medium, cooling the absorbed gases by direct contact with liquid cooling means, thereafter elevating the temperature of the gases to such degree that condensation is avoided, and adding oxygen to the cycle before return of the gases to the furnace and after elevation of the temperature.

In testimony whereof, I affix my signature.

OLAF JENSEN.